(12) United States Patent
Phillips

(10) Patent No.: US 6,543,506 B1
(45) Date of Patent: Apr. 8, 2003

(54) MODELLING APPARATUS AND METHOD

(75) Inventor: John Clifford Phillips, Coventry (GB)

(73) Assignee: Marrill Engineering Co. Limited, Coventry (GB)

( * ) Notice: Subject to any disclaimer, the term of this patent is extended or adjusted under 35 U.S.C. 154(b) by 0 days.

(21) Appl. No.: 09/529,713

(22) PCT Filed: Oct. 14, 1997

(86) PCT No.: PCT/GB97/02715
§ 371 (c)(1),
(2), (4) Date: Jun. 27, 2000

(87) PCT Pub. No.: WO99/19136
PCT Pub. Date: Apr. 22, 1999

(51) Int. Cl.[7] ............................................... B32B 31/00
(52) U.S. Cl. .................. 156/353; 156/257; 156/268; 156/356; 156/272.8; 156/512; 156/517; 156/558; 156/563; 156/529; 156/523; 156/524; 156/525; 156/526; 156/569; 156/570; 156/571; 156/572; 700/98; 700/119
(58) Field of Search .......................... 700/98, 118, 119, 700/122; 156/353, 356, 357, 361, 272.8, 378, 523, 524, 526, 529, 512, 264, 268, 257, 517, 525, 558, 563, 569, 570, 571–572; 264/138

(56) References Cited

U.S. PATENT DOCUMENTS 5,997,681 A * 12/1999 Kinzie ........................ 156/263

FOREIGN PATENT DOCUMENTS

EP        0 633 129 A1 *  1/1995

* cited by examiner

Primary Examiner—Linda Gray
(74) Attorney, Agent, or Firm—Mitchell Silberberg & Knupp LLP

(57) ABSTRACT

A modeling apparatus for producing a model by lamination of sheet material including a support platform which can be raised and lowered, a sheet feed mechanism for feeding sheet material over the platform, a superstructure mounted over the platform, a cutting mechanism for cutting the sheet material to form shaped portions, an adhesive applicator for applying adhesive to the shaped portions, and a control mechanism.

15 Claims, 3 Drawing Sheets

MODELLING APPARATUS AND METHOD

This invention relates to apparatus for and a method of modelling which may be referred to as rapid modelling. It particularly relates to modelling using laminations of sheet material built up to produce a finished three-dimensional shape.

The technique of modelling using laminated sheet material is generally known and referred to as LOM (Laminated Object Manufacturing). Reference may be made to EP-B-272 305 of Feygin for general information.

In the known apparatus used for LOM, a roll of resin-impregnated paper is fed to lie horizontally on a support platform and ironed in place using a hot roller. A laser is used to trace the outline of a thin section of the object to be formed. The laser also traces a grid of break-lines in the portions of the paper sheet which will not be required for the finished object. Another sheet of paper from the roll is then fed onto the support platform, ironed in place and laser cut, the shape of the section being altered as required to comply with computer-generated instructions. Ultimately, a solid object will be built up from the paper layers, effectively incorporated in a solid body of paper laminations. The scrap is cut or broken away using the laser-cut break-lines, to reveal the object.

Although this technique has many potential uses, it is intended for making objects of a durable nature, for example prototypes, visualisation models for new designs, or moulds for short-run moulding.

There is a need for rapid manufacturing of objects which are not necessarily intended to be durable in the same way as laminated paper models produced hitherto. For example, casting of metals often requires the use of sacrificial mould patterns or cores which are currently made by machining polystyrene foam (or other synthetic foam materials) to produce the required three-dimensional shape. When the molten metal is to be cast, the pattern is used to form a sand-mould and the molten metal vaporises the foam. Machining, particularly of a large-sized sacrificial pattern, is expensive and requires setting up of machines for each pattern. Since the pattern cannot be recovered after use, a cheaper and more flexible manufacturing process for sacrificial patterns would be desirable.

Hitherto, no satisfactory means of adapting LOM techniques has been found to operate with foams or cellular materials in general. It will be appreciated that the texture of a synthetic foam is not homogeneous, because the sizes and shapes of the individual bubbles or cells in the foam cannot usually be controlled with any accuracy and nor can the way in which the bubbles or cells pack together and coalesce.

One object of the present invention to provide an apparatus for modelling using cellular structure sheet material, and also a method of modelling.

According to the invention there is provided modelling apparatus comprising:
(a) a support platform or table adapted to be incrementally raised and lowered in response to a predetermined program;
(b) a sheet feed mechanism for feeding cellular structure sheet material onto or over the support platform;
(c) a superstructure mounted over said support platform;
(d) cutting means movably mounted on said superstructure for cutting said sheet material to a predetermined depth and for positioned movement relative thereto and as determined by a said predetermined program so that a resulting cut out portion or portions from the sheet material remains or remain on the support platform;
(e) adhesive applicator means operable over said support platform for applying adhesive to said cut out portion or portions of said sheet material and as determined by a said predetermined program;
(f) and control means including input means for input of information concerning the desired size and shape of the model to be made and output control means for controlling the sheet feed mechanism and the movement of said support platform and of the cutting means and of the adhesive applicator means in accordance with a said predetermined program.

Preferably, the sheet feed mechanism comprises a pair of rollers, namely a feed roller having a roll of cellular structure sheet material thereon, and a take-off roller adapted to receive and roll up the apertured scrap cellular structure sheet material after cutting. The pair of rollers may have tension control means adapted to maintain sufficient tension in the cellular structure sheet material to maintain it in a flat condition on the support platform.

The cutting means may be mounted on carriage means movable on the superstructure in two orthogonal directions for co-ordinated positioning movement of the cutting means. The adhesive applicator means may be similarly mounted e.g., with the cutting means.

A travelling smoothing device may be provided on the superstructure, for example a brush, squeegee or roller for smoothing down further fed cellular structure sheet material against an adhesively coated underlying cut out portion or portions.

The cutting means may comprise a laser. Alternatively, it may comprise a plasma cutter, a solvent cutter or a hot wire cutter. The cutting means is preferably mounted vertically, at right angles to the support platform and is arranged to give a cut of predetermined depth equal to the thickness of the cellular structure sheet material.

The adhesive applicator means may be a hot melt adhesive sprayer.

Means may be provided for locating a cut out portion or portions, as initially cut from the sheet material, on the support platform to prevent displacement thereon from the required position.

Viewed from another aspect, the invention provides a method of modelling comprising the steps of:
(i) providing a support platform or table adapted to be incrementally raised and lowered in response to a predetermined program;
(ii) feeding cellular structure sheet material onto the support platform;
(iii) cutting said sheet material for its full depth and at positions determined by said predetermined program so that a cut out portion or portions from the sheet material remains or remain on the support platform;
(iv) applying adhesive to the cut out portion or portions from said sheet material at positions determined by said predetermined program;
(v) incrementally lowering the support platform so that the cut out portion or portions of cellular structure sheet material thereon is or are lowered from the remainder of the cellular structure sheet material;
(vi) feeding further cellular structure sheet material over the support platform and previously cut out portion or portions thereon;
(vii) incrementally raising the support platform so that said cut out portion or portions abut the underside of said further cellular structure sheet material;
(viii) causing or allowing the adhesive to secure the further cellular structure sheet material to the cut out portion or portions underlying it;

(ix) cutting said further cellular structure sheet material for substantially its full depth, without cutting the underlying cut out portion or portions; and repeating steps (iv) to (ix) until the desired model has been completed.

Step (viii) may comprise smoothing the further cellular structure sheet material with a travelling smoothing device against the underlying adhesively coated cut out portion or portions for ensuring adhesion thereto.

As a final step, any internal portions of the model to which no adhesive has been applied may be broken out of the model or otherwise removed.

The cellular structure sheet material may comprise polystyrene foam and may be in the form of sheets of between 3 mm and 10 mm in thickness and preferably about 3 mm to 5 mm thick. The sheet material may be sufficiently flexible for providing on a roll or may be more rigid, in which latter case individual sheets may be fed using a sheet feeder for example a suction i.e., vacuum feeder or a gravity-operated hopper feed.

Alternatively, the cellular structure sheet material may comprise urea formaldehyde foam, polyurethane foam or other rigid or semi-rigid structurally stable foam, material, with or without fillers or fibre additives. Alternatively the cellular structure sheet material may be a naturally occurring cellular material such as wood or cork.

An embodiment of the invention will now be described in more detail by way of example only, with reference to the accompanying drawings, in which.

Figure 1:
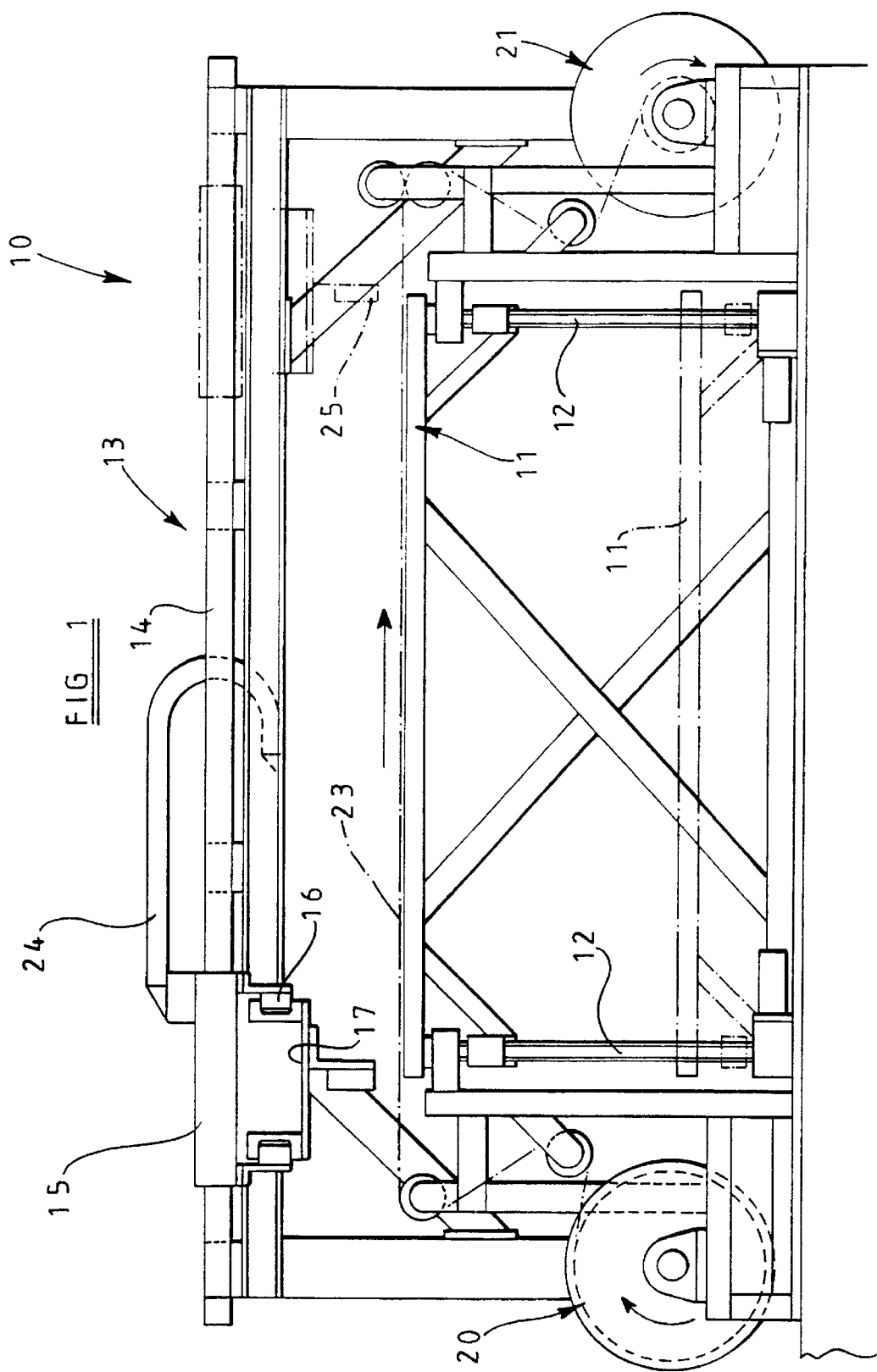
FIG. 1 is a side elevation of apparatus for rapid modelling.
Figure 2:
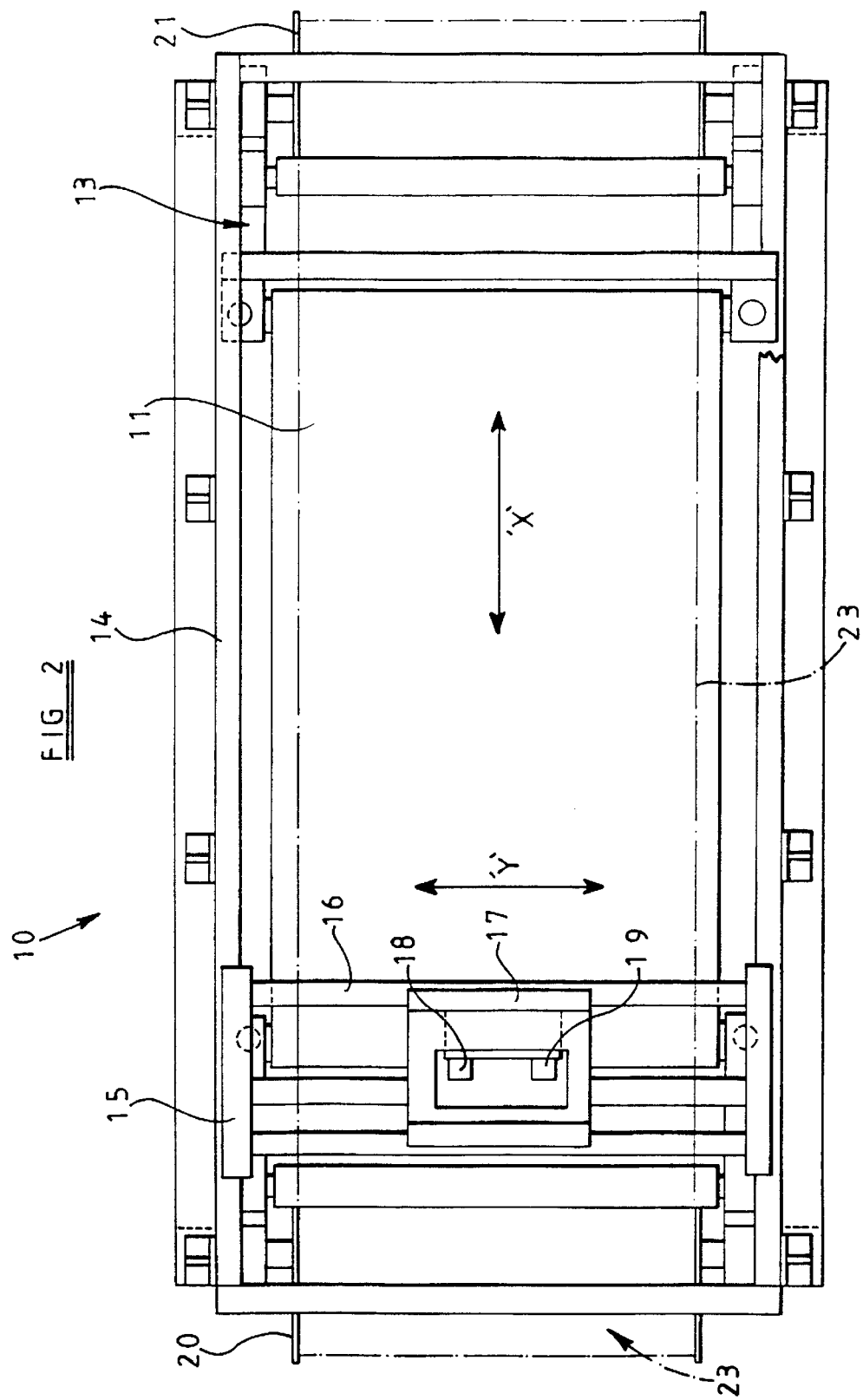
FIG. 2 is a plan view of the apparatus of FIG. 1.
Figure 3:
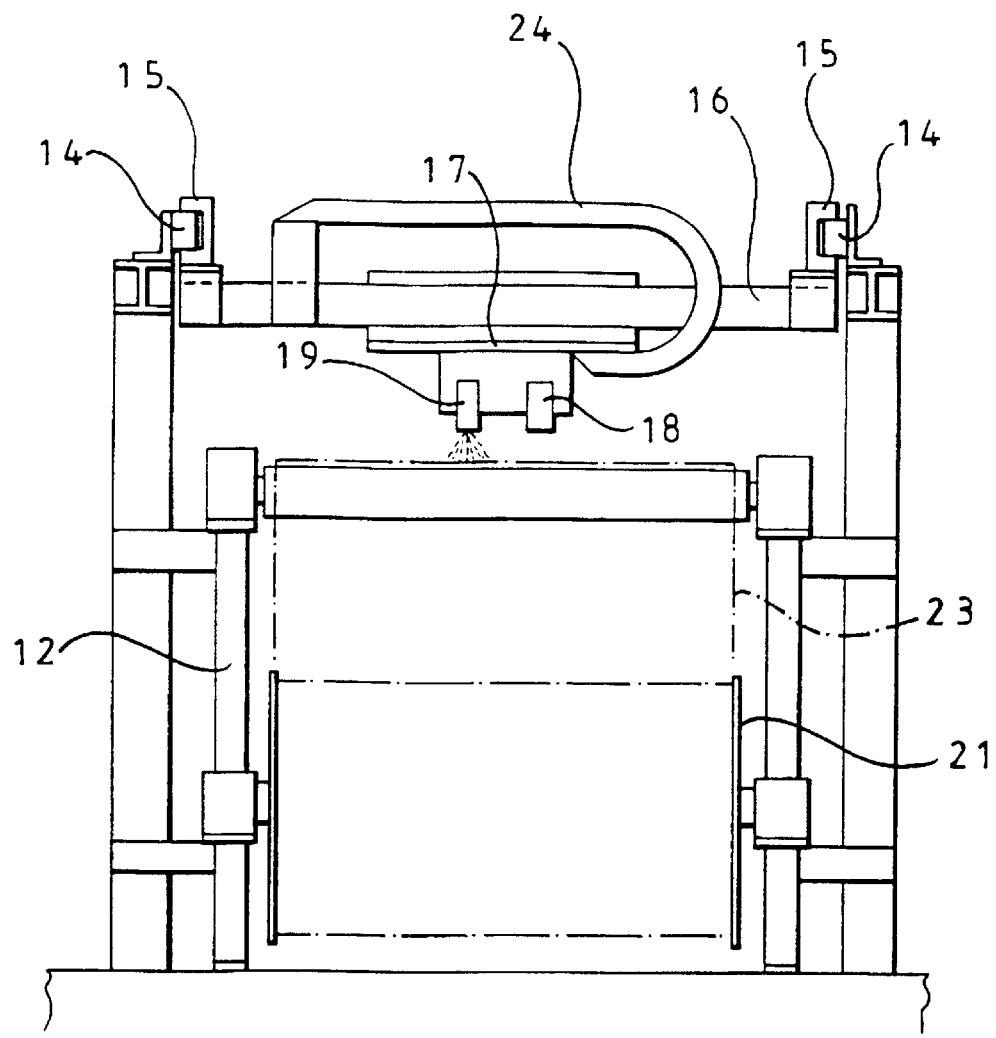
FIG. 3 is an end elevation of the apparatus of FIGS. 1 and 2.

Referring to the drawings, apparatus for rapid modelling according to the invention is illustrated at 10 and comprises a support platform 11 which is provided on support guides 12 mounted vertically and parallel, the platform having a precision lift and lower mechanism, for example using electrically operated ball-screws (not visible). The support platform can be seen in chain-dotted outline in a lowered position in FIG. 1.

A gantry superstructure 13 is accurately positioned above the support platform 11 and has longitudinal X-axis horizontal rails 14 which support a first carriage 15, itself having transverse Y-axis horizontal rails 16 supporting a second carriage 17. Thus, within the area of the superstructure, the second carriage 17 can be moved to any position defined by X and Y co-ordinates over the support platform 11 and cellular structure sheet material 23 thereon.

The second carriage 17 supports a laser 18 and an adhesive spray head 19, for movement over the area of the support platform 11.

A pair of rollers 20 and 21 are provided at opposite ends of the support platform 11. The rollers 20, 21 are linked by common drive means and are respectively supply and take-off rolls for continuous feed of the cellular sheet material 23 onto or over the platform 11. The sheet material 23 is tensioned by a predetermined amount, sufficient to keep it taut and free from undulations as it is positioned on or over the support platform, but insufficient to cause tearing or stretching of the sheet material. The necessary amount of tensioning will be determined in accordance with the characteristics of the sheet material and is shown effected by spring loaded jockey rollers 22.

In this example, the sheet material is low density expanded polystyrene having a thickness of 3 mm.

The laser 18 is of relatively low power, averaging 30 watts, and is mounted vertically on the second carriage 17, for direct movement over the sheet material 23. A lens having a focal length of between 100 and 120 mm is provided to focus the laser on the sheet material 23 and the lens has an inert gas delivery device intended to keep the lens clean in use. The laser is water-cooled. Suitable electrical cabling 24 is provided. Fume-extraction and safety-screening of the laser cutting area are required in use.

The laser 18 is focused on the sheet material 23 and the laser power and the speed of travel of the laser over the sheet are controlled so that the latter is cleanly cut and the depth of cut equals the thickness of the sheet material 23, but no more for obtaining complete detachment of the cut out portion or portions from the remainder of the sheet material 23.

Low density expanded polystyrene material is inhomogeneous and flammable, so that the laser cuts with a limited degree of accuracy. However, for the uses envisaged for the finished model, for example as a sacrificial pattern for casting metal, the degree of accuracy required is not great.

The adhesive used is a hot-melt adhesive, so heating means have to be provided on the spray head 19.

In addition to the carriage assembly 15, 17, a smoothing device such as a roller or, as shown, a brush or squeegee 25 is mounted for movement on the X-axis horizontal rails 14, as shown in dotted lines in FIG. 1.

Operation of the apparatus to make a model or object such as a casting pattern is as follows:

The support platform 11 is raised to its maximum height and foam sheet material 23 is fed on to it under controlled tension from the supply roller 20 to the take-off roller 21. Feed then stops.

The gantry-mounted carriage assembly of the first carriage 15 and second carriage 17 is then caused to move under control of a program input by the user, for example a CAD program. The laser 18 is operated at suitable power and traversed across the sheet material 23 to cleanly cut it for the entire depth of the sheet and to fully sever one or more cut out portions from the sheet 23 and leave it or them on the support platform 11. The laser 18 is then switched off and the carriage assembly again moves in a predetermined path across the cut out portion or portions, this time with the adhesive spray head 19 operating. The cut out portion or portions is or are coated or partly coated with adhesive. This may be confined to the regions adjacent the laser-cut edges or may cover the entire surface or may, for example, criss-cross the surface. If desired the adhesive application may closely follow the laser beam during the cutting operation.

The support platform 11 is incrementally lowered using the guides 12, until it has dropped by more than the thickness of the foam sheet material 23. The rollers 20 and 21 are again operated to move the apertured scrap sheet material onto the take-off roller 21 and to feed further sheet material from the supply roll 20 to overlie the support platform. The support platform 11 is incrementally raised so that the adhesively coated cut out portion or portions of the sheet material now come into contact with the underside of the further sheet material.

The smoothing device 25 passes over the upper surface of the further sheet material 23, causing it to adhere firmly to the adhesive on the cut out portion or portions of foam sheet material on the support platform 11.

The laser 18 is again operated and traversed to cut the further sheet material. It is important that the full depth of cut is carefully controlled, to prevent further cutting of the underlying portions cut out by the laser during its previous operation, and also to ensure fully cutting through the further sheet material. It will be appreciated that each sheet may be cut to a different shape, under the control of the CAD program.

Further adhesive is sprayed onto the cut out portion or portions from the further sheet material, the support platform is again lowered, the sheet material fed, the support platform raised, the sheet material smoothed down and further cutting takes place, until the desired model or models has or have been completed. No adhesive is sprayed onto the uppermost final cut out portion or portions and the support platform is lowered to its maximum amount to remove the model or models.

During the initial operation of the apparatus and having regard to the light weight nature of cellular structure foam material, provision may be included for locating the first cut out portion or portions against displacement on the support platform 11 which might otherwise adversely affect the form of the finished model or models. Thus a central projection or projections such as spikes may be provided on the platform 11 and of a height substantially equal to the thickness of the sheet material e.g., 3 mm to 5 mm. The spikes may be initially retractable to avoid tearing the first feed of sheet material onto the platform but thereafter remain in the operative raised position. Alternatively such tearing may be avoided by sufficiently lowering the platform with fixed spikes under the tensioned initially fed sheet material, location being then effected on raising the platform against the underside of the sheet material.

It will be appreciated that the apparatus and method described by way of example may be modified for use with other cellular sheet material. For example, thicker cellular sheet material may be relatively stiff and would therefore be fed in separate sheets instead of from a continuous roll, using any conventional type of sheet feeder, such as a suction i.e., vacuum feeder or gravity-fed hopper type. Laser cutting might be replaced for other materials by solvent jet cutting, plasma cutting or hot wire cutting. Alternatively, if a higher-powered and hence heavier, laser were required, the direct vertically mounted laser might need to be replaced by a fixed laser operating through "flying optics", that is, a system of movable mirrors and/or lenses on the superstructure providing a laser cutting beam.

I claim:

1. Modelling apparatus for producing a model or models by lamination of sheet material comprising:
   (a) a support platform adapted to be incrementally raised and lowered in response to a predetermined program;
   (b) a sheet feed mechanism for feeding cellular structure sheet material onto or over the support platform;
   (c) a superstructure mounted over said support platform;
   (d) cutting means for cutting said sheet material to a predetermined depth, said cutting means being movable along a first predetermined path in response to said predetermined program thereby to cut a shaped portion from the sheet material on the support platform;
   (e) adhesive applicator means mounted above said support platform for applying adhesive to said shaped portion of said sheet material and movable in a predetermined manner in accordance with said predetermined program;
   (f) and control means including input means for input of information concerning the desired size and shape of the model to be made and output control means for controlling the sheet feed mechanism and movement of said support platform, the cutting means and the adhesive applicator means in accordance with said predetermined program;

characterised in that there is provided:
   said superstructure mounted over said support platform and wherein:
      said cutting means and said adhesive applicator means are supported on carriage means;
      said carriage means is mounted on said superstructure for movement in a horizontal plane above said support platform;
      said control means is operable to move said carriage means in said horizontal plane:
   (a) along said first predetermined path to enable cutting of said sheet material by said cutting means, and
   (b) in said predetermined manner to enable application of adhesive to said shaped portion of said sheet material by said adhesive applicator means;
      the superstructure carries linearly movable thereon a first carriage of said carriage means which in turn carries a second carriage of said carriage means linearly movable thereon for movement of the second carriage in two orthogonal directions (X and Y);
      and said second carriage carries the cutting means and adhesive applicator means.

2. Modelling apparatus according to claim 1 wherein said carriage means is movable on the superstructure in two orthogonal directions for coordinated positioning movement of the cutting means.

3. Modelling apparatus according to claim 1 wherein the cutting means comprises a laser or comprises a plasma cutter or a solvent jet cutter or a hot wire cutter.

4. Modelling apparatus according to claim 1 wherein the adhesive applicator means comprises a hot melt adhesive sprayer.

5. Modelling apparatus according to claim 1 wherein the superstructure carries a travelling smoothing device for smoothing down the cellular structure sheet material fed over the support platform and upon a previously cut out and adhesively coated portion or portions thereunder on the support platform.

6. Modelling apparatus according to claim 1, further comprising a roller feed mechanism for effecting feeding of the flexible cellular structure sheet material onto or over the support platform, said roller feed mechanism comprising:
   a feed roller for receiving a roll of flexible cellular structure sheet material thereon and for feeding it onto or over the support platform;
   and a take-off roller for receiving and rolling up scrap cellular structure sheet material from the support platform after the cutting of the cut out portion or portions from the fed sheet material.

7. Modelling apparatus according to claim 6 wherein the roller feed mechanism includes tensioning means for maintaining sufficient tension in the flexible cellular structure sheet material in order to maintain it in a flat condition on or over the support platform.

8. Modelling apparatus according to claim 1 wherein the cellular structure sheet material of substantially rigid or semi-rigid form is employed, and wherein the sheet feed mechanism is provided for individual sheet feed of such cellular structure sheet material onto or over the support platform.

9. Modelling apparatus according to claim 1 wherein an optical system movably mounted on the superstructure such as on carriage means of the latter is arranged to direct a cutting laser beam of laser cutting means onto the cellular structure sheet material from fixedly mounted laser apparatus.

10. Modelling apparatus according to claim 1 wherein location means is provided for location of at least an initially cut out portion or portions from the cellular structure sheet material on or over the support platform against displacement of said cut out portion or portions thereon.

11. Modelling apparatus according to claim 10 wherein said location means comprises at least one of a projection and a spike means on said support platform.

12. Modelling apparatus for producing a model or models by lamination of sheet material comprising:
   (a) a support platform adapted to be incrementally raised and lowered in response to a pre-determined program.
   (b) a sheet feed mechanism for feeding cellular structure sheet material onto or over the support platform;
   (c) a superstructure mounted over said support platform;
   (d) cutting means for cutting said sheet material to a predetermined depth, said cutting means being movable along a first predetermined path in response to said predetermined program thereby to cut a shaped portion from the sheet material on the support platform;
   (e) adhesive applicator means mounted above said support platform for applying adhesive to said shaped portion of said sheet material and movable in a predetermined manner in accordance with said predetermined program;
   (f) and control means including input means for input of information concerning the desired size and shape of the model to be made and output control means for controlling the sheet feed mechanism and movement of said support platform, the cutting means and the adhesive applicator means in accordance with said predetermined program;
characterised in that there is provided:
   said superstructure mounted over said support platform and wherein:
      said cutting means and said adhesive applicator means are supported on carriage means;
      said carriage means is mounted on said superstructure for movement in a horizontal plane above said support platform;
      said control means is operable to move said carriage means in said horizontal plane:
      (a) along said first predetermined path to enable cutting of said sheet material by said cutting means, and
      (b) in said predetermined manner to enable application of adhesive to said shaped portion of said sheet material by said adhesive applicator means;
   and the adhesive applicator means comprises a hot melt adhesive sprayer.

13. Modelling apparatus for producing a model or models by lamination of sheet material comprising:
   (a) a support platform adapted to be incrementally raised and lowered in response to a pre-determined program;
   (b) a sheet feed mechanism for feeding cellular structure sheet material onto or over the support platform;
   (c) a superstructure mounted over said support platform;
   (d) cutting means for cutting said sheet material to a predetermined depth, said cutting means being movable along a first predetermined path in response to said predetermined program thereby to cut a shaped portion from the sheet material on the support platform;
   (e) adhesive applicator means mounted above said support platform for applying adhesive to said shaped portion of said sheet material and movable in a predetermined manner in accordance with said predetermined program;
   (f) control means including input means for input of information concerning the desired size and shape of the model to be made and output control means for controlling the sheet feed mechanism and movement of said support platform, the cutting means and the adhesive applicator means in accordance with said predetermined program;
   (g) and a roller feed mechanism for effecting feeding of the flexible cellular structure sheet material onto or over the support platform;
characterised in that there is provided:
   said superstructure mounted over said support platform and wherein:
      said cutting means and said adhesive applicator means are supported on carriage means;
      said carriage means is mounted on said superstructure for movement in a horizontal plane above said support platform;
      said control means is operable to move said carriage means in said horizontal plane:
      (a) along said first predetermined path to enable cutting of said sheet material by said cutting means, and
      (b) in said predetermined manner to enable application of adhesive to said shaped portion of said sheet material by said adhesive applicator means;
   and said roller feed mechanism comprises:
      a feed roller for receiving a roll of flexible cellular structure sheet material thereon and for feeding it onto or over the support platform;
      and a take-off roller for receiving and rolling up scrap cellular structure sheet material from the support platform after the cutting of the cut out portion or portions from the fed sheet material.

14. Modelling apparatus for producing a model or models by lamination of sheet material comprising:
   (a) a support platform adapted to be incrementally raised and lowered in response to a pre-determined program;
   (b) a sheet feed mechanism for feeding cellular structure sheet material onto or over the support platform;
   (c) a superstructure mounted over said support platform;
   (d) cutting means for cutting said sheet material to a predetermined depth, said cutting means being movable along a first predetermined path in response to said predetermined program thereby to cut a shaped portion from the sheet material on the support platform;
   (e) adhesive applicator means mounted above said support platform for applying adhesive to said shaped portion of said sheet material and movable in a predetermined manner in accordance with said predetermined program;
   (f) and control means including input means for input of information concerning the desired size and shape of the model to be made and output control means for controlling the sheet feed mechanism and movement of said support platform, the cutting means and the adhesive applicator means in accordance with said predetermined program;
characterised in that there is provided:
   said superstructure mounted over said support platform and wherein:
      said cutting means and said adhesive applicator means are supported on carriage means;
      said carriage means is mounted on said superstructure for movement in a horizontal plane above said support platform;

said control means is operable to move said carriage means in said horizontal plane:
  (a) along said first predetermined path to enable cutting of said sheet material by said cutting means, and
  (b) in said predetermined manner to enable application of adhesive to said shaped portion of said sheet material by said adhesive applicator means;
and further comprising a roller feed mechanism for effecting feeding of the flexible cellular structure sheet material onto or over the support platform, said roller feed mechanism comprising:
  a feed roller for receiving a roll of flexible cellular structure sheet material thereon and for feeding it onto or over the support platform;
  and a take-off roller for receiving and rolling up scrap cellular structure sheet material from the support platform after the cutting of the cut out portion or portions from the fed sheet material;
  wherein the roller feed mechanism includes tensioning means for maintaining sufficient tension in the flexible cellular structure sheet material in order to maintain it in a flat condition on or over the support platform.

15. Modelling apparatus for producing a model or models by lamination of sheet material comprising:
  (a) a support platform adapted to be incrementally raised and lowered in response to a pre-determined program;
  (b) a sheet feed mechanism for feeding cellular structure sheet material onto or over the support platform;
  (c) a superstructure mounted over said support platform;
  (d) cutting means for cutting said sheet material to a predetermined depth, said cutting means being movable along a first predetermined path in response to said predetermined program thereby to cut a shaped portion from the sheet material on the support platform;
  (e) adhesive applicator means mounted above said support platform for applying adhesive to said shaped portion of said sheet material and movable in a predetermined manner in accordance with said predetermined program;
  (f) and control means including input means for input of information concerning the desired size and shape of the model to be made and output control means for controlling the sheet feed mechanism and movement of said support platform, the cutting means and the adhesive applicator means in accordance with said predetermined program;
characterised in that there is provided:
  said superstructure mounted over said support platform and wherein:
    said cutting means and said adhesive applicator means are supported on carriage means;
    said carriage means is mounted on said superstructure for movement in a horizontal plane above said support platform;
    said control means is operable to move said carriage means in said horizontal plane:
    (a) along said first predetermined path to enable cutting of said sheet material by said cutting means, and
    (b) in said predetermined manner to enable application of adhesive to said shaped portion of said sheet material by said adhesive applicator means;
  and the cellular structure sheet material of substantially rigid or semi-rigid form is employed, and wherein the sheet feed mechanism is provided for individual sheet feed of such cellular structure sheet material onto or over the support platform.

* * * * *